United States Patent [19]
Rehm

[11] Patent Number: 5,979,039
[45] Date of Patent: Nov. 9, 1999

[54] TRANSFER LINE

[75] Inventor: Karl Rehm, Mindelheim, Germany

[73] Assignee: Grob-Werke GmH & Co. KG, Mindelheim, Germany

[21] Appl. No.: 09/063,785

[22] Filed: Apr. 22, 1998

[30] Foreign Application Priority Data

Apr. 22, 1997 [DE] Germany .............................. 197 16 811

[51] Int. Cl.$^6$ .............................. B23Q 7/00; B23P 23/00
[52] U.S. Cl. .............................. 29/563; 29/33 P; 29/564; 408/70; 409/137
[58] Field of Search .................................... 29/33 P, 563, 29/564, DIG. 94, DIG. 79, DIG. 102; 409/221, 201, 211, 137, 158, 159, 163, 164, 172; 408/69, 70, 44

[56] References Cited

U.S. PATENT DOCUMENTS

| 4,309,600 | 1/1982 | Perry et al. ........................... 29/33 P X |
| 5,197,527 | 3/1993 | Namba et al. ....................... 409/107 X |
| 5,321,874 | 6/1994 | Mills et al. .............................. 29/33 P |
| 5,781,983 | 7/1998 | Grünr ......................................... 29/563 |

FOREIGN PATENT DOCUMENTS

| 25 04 523 | 8/1976 | Germany . |
| 0154 071 | 2/1982 | Germany . |
| 41 17 723 | 12/1991 | Germany . |
| 56-9101 | 1/1981 | Japan . |
| 1 166 965 | 7/1985 | U.S.S.R. . |
| 2 086 290 | 5/1982 | United Kingdom . |

*Primary Examiner*—William Briggs
*Attorney, Agent, or Firm*—Jacobson, Price, Holman & Stern, PLLC

[57] ABSTRACT

In a transfer line for the metal-cutting machining of workpieces, the transfer line including a plurality of machining stations arranged one after the other substantially in one plane. The workpieces are arranged in hanging fashion in such a way that clamping devices are arranged above the workpieces, thereby providing a falling and collecting space for the cuttings under the workpieces. Removal of cuttings is thereby facilitated and it is not necessary to flush the cuttings away using large amounts of coolant.

9 Claims, 6 Drawing Sheets

TRANSFER LINE

BACKGROUND OF THE INVENTION

The invention relates to a transfer line for the metal-cutting machining of workpieces, in which a plurality of machining stations comprising tools together with their drives and guides are arranged one after the other substantially in one plane and transfer devices convey the workpieces to the machining stations in which the workpieces are held by clamping devices during machining.

Transfer lines of the type described above are known. They serve, for example, for the fully automatic machining of workpieces of essentially the same kind, for example engine blocks. In the individual machining stations of the transfer line, the various machining operations are performed by suitable machining units and tools. When the machining operations are completed, the transfer devices move the workpieces in an operating cycle to the next machining station.

As a rule, liquid cooling lubricants are employed for the machining operations, the function of which is to lubricate and cool the tools and also to flush away the cut-off cuttings. For this purpose, there is arranged beneath the workpiece-conveying path a channel which receives the cuttings and the coolant. The channel may be arranged either in the machine bed or on the floor on which the machining stations also stand, or a suitable underfloor channel or drain is provided. In the channel or drain, there are then provided conveying devices for the cuttings, for example screw conveyors, band conveyors, scraper conveyors, flap conveyors or else flushing nozzles, which carry the cuttings away.

The use of the cooling lubricant is relatively expensive. On the one hand, a high delivery rate is required, and on the other hand appropriate devices for maintaining a supply of and for cleaning the cooling lubricant are required.

An object of the present invention is to avoid the use of cooling lubricant as far as possible, especially as the wetting of the cuttings by the cooling lubricant is also undesirable.

BRIEF SUMMARY OF THE INVENTION

This and other objects of the invention are achieved in the invention by the provision of a transfer line for the metal-cutting machining of workpieces, in which a plurality of machining stations comprising tools together with their drives and guides are arranged one after the other substantially in one plane and transfer devices convey the workpieces to the machining stations in which the workpieces are held by clamping devices during machining, wherein the clamping devices which fix the workpieces are arranged above the workpieces and the workpieces hang down during the machining operation, and in that a falling and collecting space for the cuttings, which is kept free of clamping devices and machining heads, is arranged under the workpieces.

The arrangement according to the invention obviates the need for the cooling lubricant to flush away the cuttings which are produced. Insofar as cooling is actually required, this may be effected, for example, by an air-oil mixture or else by small amounts of an alcohol solution. The supply of suitable, small amounts of liquid is also recommended when machining special materials, such as, for example, aluminium, in order to avoid undesired build-up on the cutting edge or wear of the tools.

DETAILED DESCRIPTION OF THE INVENTION

In the invention, the cuttings fall into the falling and collecting space, which may be, for example, of funnel-like design. It is possible to arrange in this collecting space transporting or discharging devices of known type, which then convey the cuttings further by mechanical means. In this way, the cuttings are produced in a virtually dry state, with any oil-air mixtures or alcohol solutions, for example, which are employed evaporating or being sucked off without residue. The previously encountered problem, namely of the cuttings building up on the tools, the workpieces, their supports or pallets, or on the clamping devices, work tables, etc., is avoided.

In the invention, the transfer of the workpieces or the workpiece supports from one machining station to the next machining station may be performed in various ways. The transfer devices may comprise, for example, cyclically operating bars which act from above on the workpieces or the supports. It is however also possible to arrange the transfer devices beneath the workpieces. The transfer devices, for example cyclically operating bars, may be formed in such a way that a buildup of falling cuttings on these devices is not possible, in particular by virtue of the fact that the upward-facing surfaces of these devices are sufficiently inclined. It is however also possible to design the transfer devices such that they are withdrawn during the machining operation and thus do not obstruct the fall of the cuttings.

In general, the tools of a machining station are arranged on one or else on both sides of the transfer device or the respective machining space. In the invention, the guides for the machining units may in particular be aligned horizontally, so that the tools are brought on to the workpieces laterally.

In a preferred embodiment of the invention, the guides of the machining units are arranged such that they enclose an acute, outwardly open angle, preferably of 45°, with the horizontal. In this way, the guides for the machining units extend into a space above the workpieces, and this affords considerable advantages. It becomes possible to cover the machining space laterally by means of shields or plates, and the passageways for the machining heads of the machine tools need to be arranged only in the upper region. This ensures that the cuttings encounter largely smooth surfaces and that it becomes possible to carry the cuttings away without disruptions. A further advantage of this arrangement is that it becomes possible to reduce the overall height. Owing to the inclined arrangement of the feed guides, the horizontal space requirement is reduced. The additional vertical space requirement is not significant, since the required space must be available there anyway.

Although it was previously stated that in the invention the falling and collecting space for the cuttings is kept free of tools and the machining units and guides therefor, this does not preclude auxiliary devices, which are suitable and required for the positioning and clamping operation, from acting from below on the workpieces or their supports. These auxiliary devices can then be withdrawn for the machining operation, so that the advantage obtained by means of the invention is fully available.

In general, it is advisable to cover the machining space, in which the workpiece is arranged and in which the working head or heads project, by shields at the sides and also at the top.

In order to avoid considerable adjusting and assembly work, it is advantageous for the tool heads to be each provided with a shield which is movable with the tool head and which covers the gap to the adjoining shields. This mode of construction affords the advantage that, during fine adjustment of the tools with respect to the workpieces, the respective shield is moved in association with the tool head. This shield covers the gap which necessarily surrounds the tool head to ensure mobility and adjustability of the latter, and then forms the connection to the adjacent shields.

DETAILED DESCRIPTION OF PREFERRED EMBODIMENTS

Figure 1:
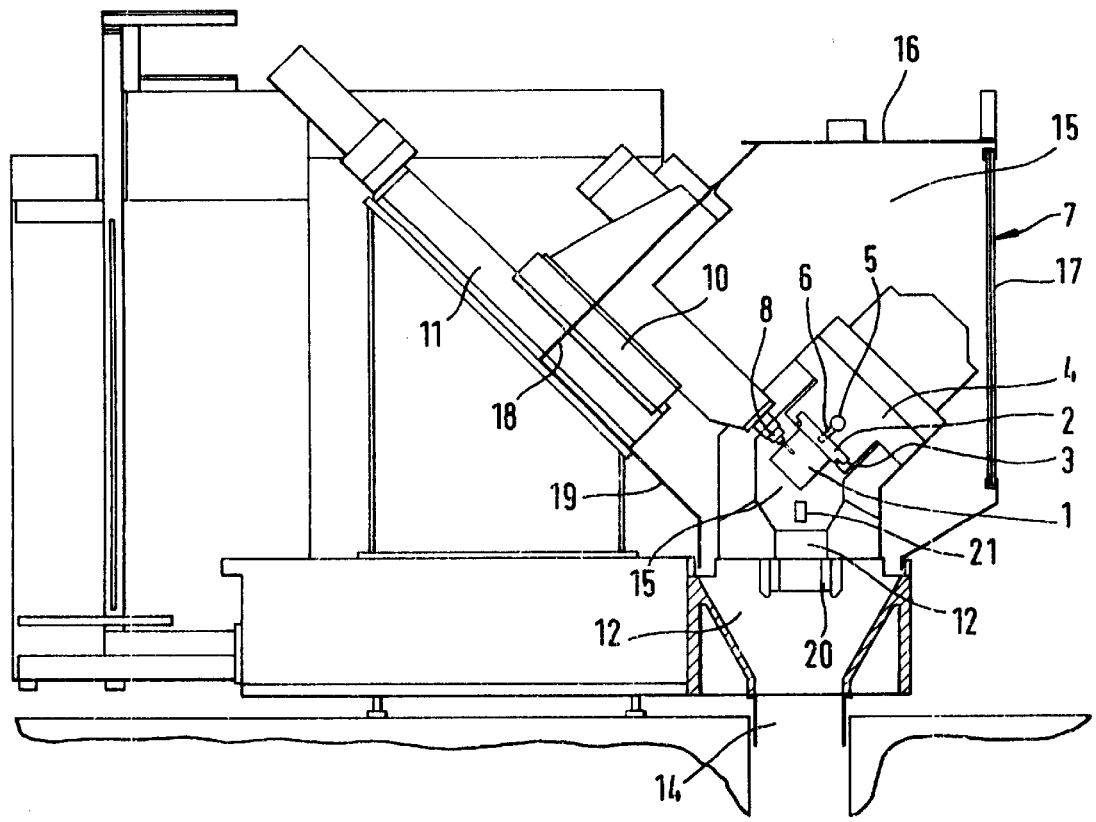
FIG. 1 shows a cross-section through a transfer line according to the invention.

In the representation of FIG. 1, a schematically illustrated workpiece 1 is held on a support or a pallet 2. The pallet 2 is movable in a guide 3 of a frame or mount 4 and can also be positioned and fixed on this frame or mount 4 for the machining operation. The corresponding equipment for this is not shown specifically.

Above the pallet 2, that is to say also above the workpiece 1, there may be provided, as can be seen in FIG. 1, a transfer device 5 in the form of a cyclically operating bar, which for example is pivotable, so that during the feed stroke a carrier 6 takes the released pallet 2 along with it and displaces it, perpendicularly to the plane of the drawing, so that the next machining station is reached.

The machining station 7 comprises a machining head 8 on which a tool 28 is arranged. A slide 10 is movable in a guide 11 and, as is clearly evident in FIG. 1, the feed direction of the slide 10 on the guide 11 encloses an angle of about 45° with the horizontal. The pallet 2 is oriented accordingly, with the result that not only the pallet 2 and the associated guides 3 of the frame or mount 4 are arranged above the workpiece 1, but also the tool 28 together with the associated equipment.

The cuttings produced during machining can pass freely into a falling and collecting space 12, to which is connected a funnel 13 which conveys the cuttings into a channel 14 in which a transporting device (not illustrated specifically) is arranged.

Shields 16,17,18 and 19 define the top and sides of the machining space 15. The shields 18 and 19 are adapted, moreover, to fit the slide 10 and the guide 11. This gives the slide 10 the required mobility with the machining head 8. The mass of cuttings reaches the falling and collecting space 12 without difficulties. The few cuttings which are flung upwards as a rule do not encounter any plane surfaces. The discharging of the cuttings in the falling and collecting space 12 is not disrupted.

Instead of the cyclically operating bar 5, a transfer device 21 may be provided beneath the workpiece 1. This transfer device is designed to promote the flowing-off of the cuttings or projects into the machining space 15 only during the cycles. During the machining operation, however, it is withdrawn outside the space. As a result, the pallet 2, for example, may be dispensed with and the workpiece 1 supported directly by the transfer device 21.

Figure 2:
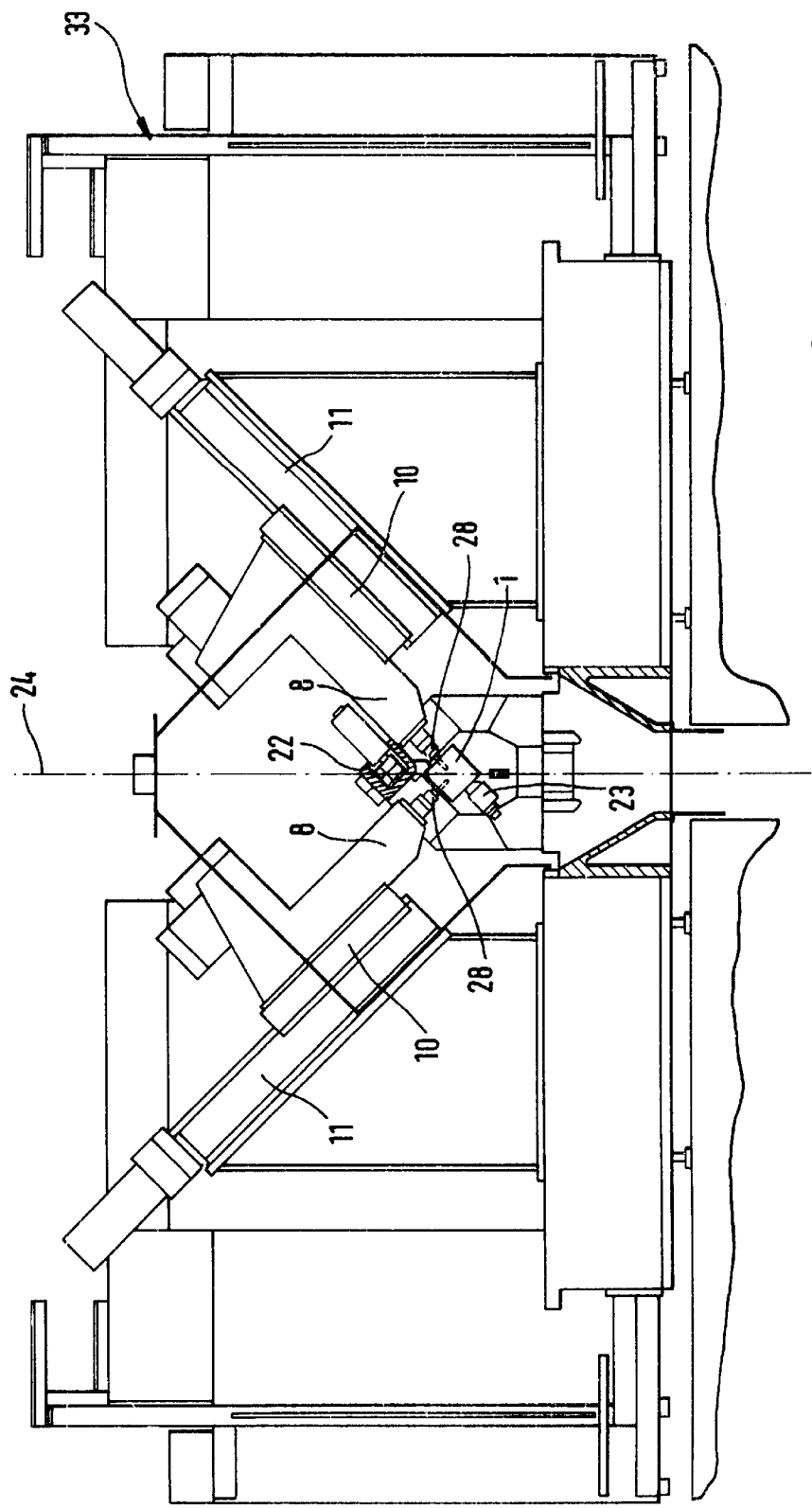
FIG. 2 shows a variant of the representation of FIG. 1.

In the variant shown in FIG. 2, the workpiece 1 is arranged essentially in the same manner in the machining station 33. A clamping device 22 is provided, by means of which the workpiece 1 is raised and firmly clamped during the transition from the transfer position to the machining position. The embodiment of FIG. 2 differs from that of FIG. 1 essentially in that there are provided two machining heads 8 which are each movable by means of a respective slide 10 on an inclined guide 11, thereby enabling simultaneous machining of the workpiece 1 from two sides by means of the two machining heads 8. The auxiliary device 23 facilitates the clamping operation and may, if necessary, be withdrawn for the machining operation.

Figure 3:
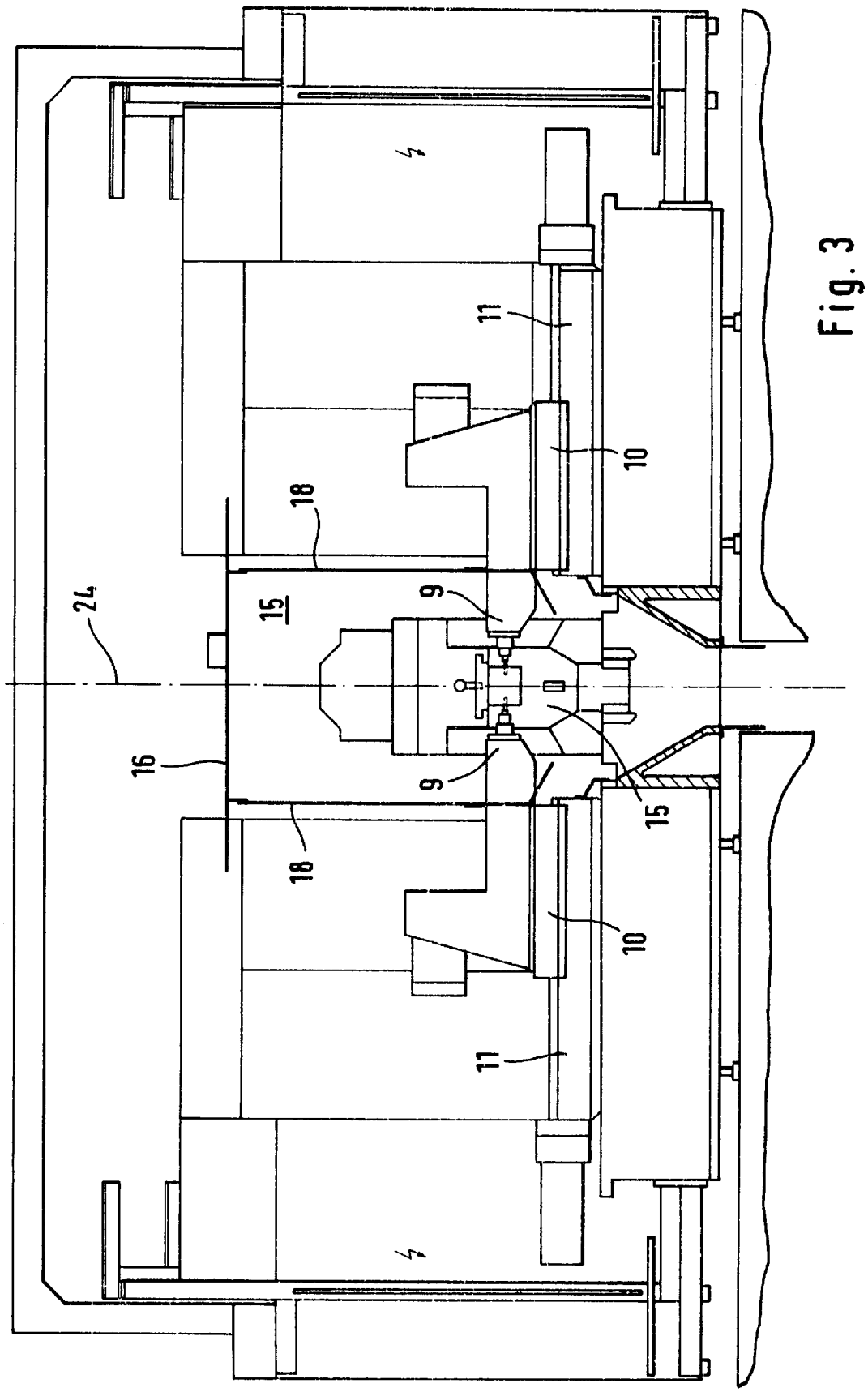
FIG. 3 shows a cross-section through a transfer line in another embodiment.

In the embodiment of FIG. 3, there are provided two machining heads 9 which are directed substantially towards one another. The guides 11 of the associated slides 10 are substantially horizontally aligned and directed towards one another. In this way, two opposite surfaces of the workpiece 1 can be machined simultaneously, the workpiece in the embodiment of FIG. 3 being supported by a pallet 2 arranged symmetrically with respect to the centre axis 24. The shields 18 move in association with the machining units and cover the sides of the machining space 15.

The shield 16 covers the top of the machining space 15. Appropriate openings for the machining heads 9 are provided in the shields 18.

Figure 4:
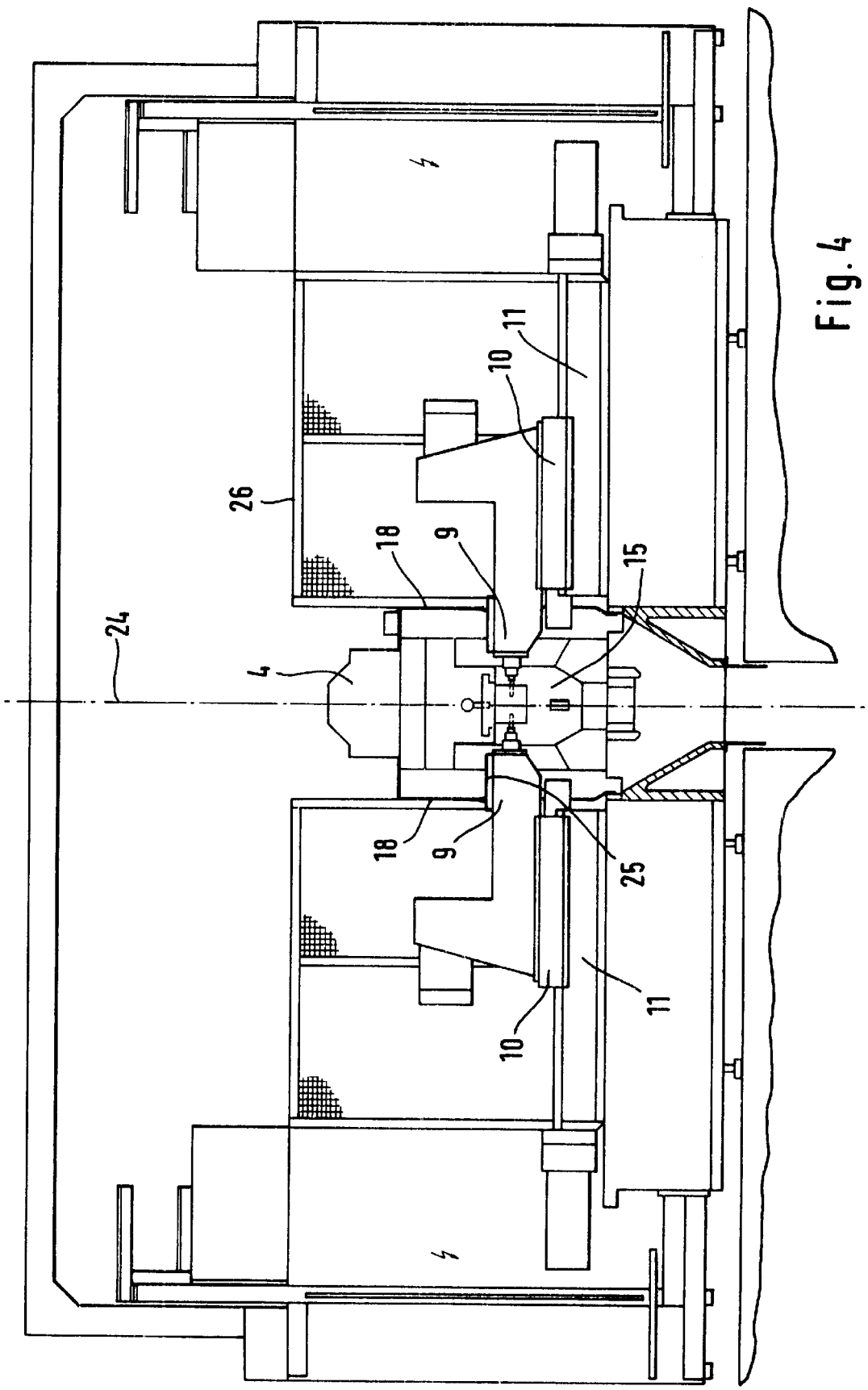
FIG. 4 shows a variant of the representation of FIG. 3.

In the embodiment of FIG. 4, the machining space 15 is reduced in size. Parts of the frame or mount 4 are arranged outside the machining space 15. Suitable openings are provided in the shields 18 for the machining heads 9 and for tubular shields 25 movable in association with the respective machining head 9. Protective gratings 26 cover the guides 11 and the slides 10.

Figure 5:
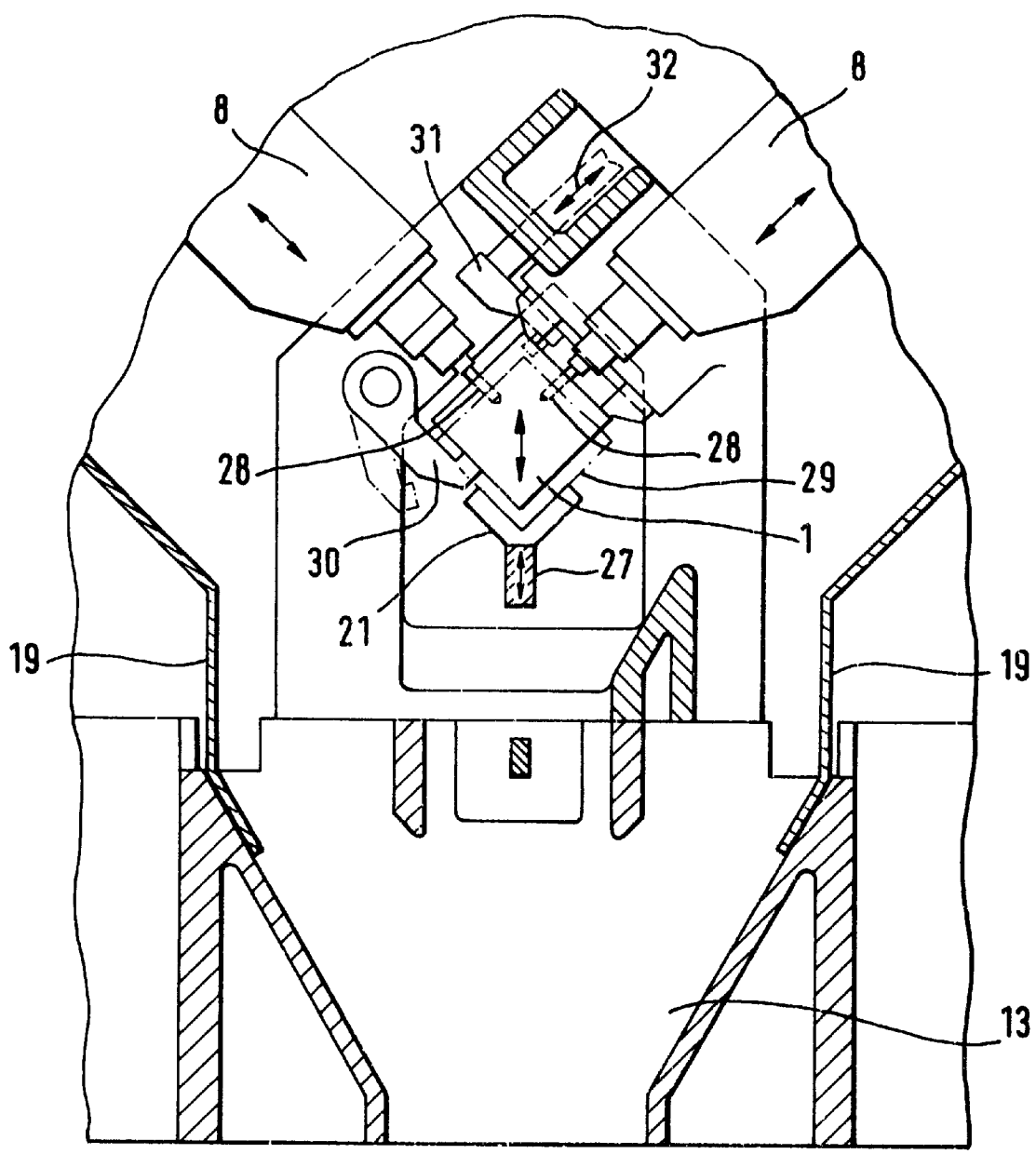
FIG. 5 shows a partial cross-section through a further variant.

The variant of the invention of FIG. 5 shows two machining heads 8 which are inclined and carry the tools 28 used to machine the schematically illustrated workpiece 1. Under the workpiece, there is provided a transfer device 21 which is movable in the vertical direction (see double arrow 27) so that the workpiece 1 can be brought from a lowered transfer position to a raised clamping position, in which machining is carried out. The lowered position is indicated by broken lines 29. For fixing and positioning in the raised machining position, use is made of a pivotable clamping lever 30 and also a further clamping device 31, which is movable in the direction of the double arrow 32.

Figure 6:
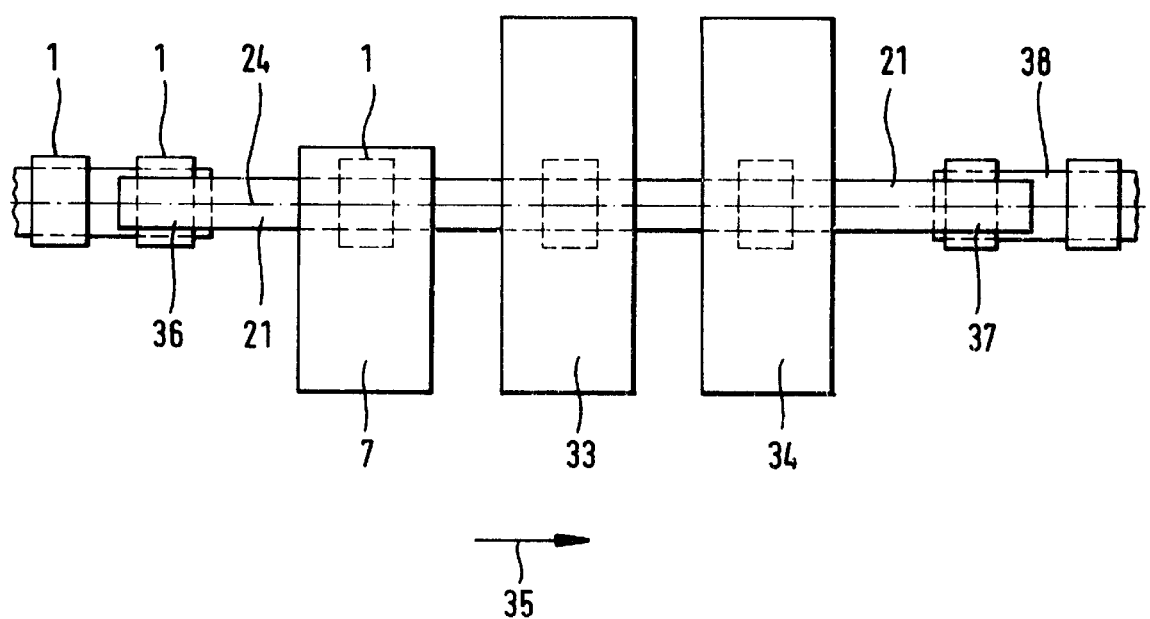
FIG. 6 shows a schematic plan view of a transfer line according to the invention on a considerably reduced scale.

In the transfer line schematically illustrated in FIG. 6, three machining stations 7,33 and 34 are arranged one after the other. The arrow 35 indicates the direction of travel of the workpieces 1. These workpieces are initially connected at 36 to the schematically illustrated transfer device 21 in such a way that the workpieces 1 hang down from the transfer device. The transfer device 21 transports the workpieces in sequence through the individual machining stations until they are removed from the transfer device 21 at 37 and placed onto a conveying device 38.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

I claim:

1. Transfer line for the metal-cutting machining of workpieces, said transfer line comprising a plurality of machining stations each comprising tools and associated drives and guides and arranged one after the other substantially in one place, at least one of said machining stations comprises one or more machining heads mounted on feed guides which enclose an acute angle with the horizontal, positioning devices for holding the workpieces in said machining stations during machining, transfer devices located above said plurality of machining stations, said transfer devices being arranged to convey the workpieces to said machining stations, a clamping device in at least one of said machining stations for clamping a workpiece, said clamping devices being arranged above the workpiece such that the workpiece hangs down during the machining operation, a falling and collecting space provided under the workpiece for receiving cuttings, said falling and cutting space being kept free of clamping devices and machining heads, and transporting and discharging devices for cuttings received in said falling and collecting space.

2. Transfer line according to claim 1, wherein said one or more machining heads and the workpiece are arranged in a machining space within said machining station, the machining heads projecting into the machining space and the top and sides of said machining space being covered by shields.

3. Transfer line according claim 1, wherein the workpieces are mounted on supports which are held by said clamping devices.

4. Transfer line according to claim 1, wherein said transfer devices comprise cyclically operating bars which act from above on the workpieces or on supports for the workpieces.

5. Transfer line according to claim 1, wherein the transfer devices are arranged beneath the workpieces.

6. Transfer line according to claim 1, wherein the transfer devices are positioned so that the transfer devices project into a space beneath the workpieces only during transfer of a workpiece from one machining station to another.

7. Transfer line according to claim 1, wherein each of said machining heads being provided with a shield which is movable in association with said machining head and covers a gap between said machining head and an adjoining shield.

8. Transfer line according to claim 1, wherein the acute angle is 45°.

9. Transfer line according to claim 1, further comprising auxiliary devices acting from below on the workpieces for positioning and clamping thereof, said auxiliary devices being withdrawn from the workpieces during a machining operation.

* * * * *